United States Patent [19]

Lundh

[11] 4,110,994
[45] Sep. 5, 1978

[54] MARINE PIPELINE

[75] Inventor: Roy Walfrid Lundh, Glendora, Calif.

[73] Assignee: Poseidon Marketing and Development Co., Arcadia, Calif.

[21] Appl. No.: 853,010

[22] Filed: Nov. 16, 1977

Related U.S. Application Data

[62] Division of Ser. No. 652,281, Jun. 26, 1976, abandoned.

[51] Int. Cl.² .............................................. F16L 1/00
[52] U.S. Cl. ..................... 405/158; 405/168; 405/172
[58] Field of Search ........................ 61/105–114; 138/111; 285/24, 27

[56] References Cited

U.S. PATENT DOCUMENTS

| 375,464 | 12/1887 | Thacher et al. | 61/112 X |
|---|---|---|---|
| 580,226 | 4/1897 | Sanford | 61/111 X |
| 3,136,133 | 6/1964 | Perret | 61/111 |
| 3,173,271 | 3/1965 | Wittgenstein | 61/112 X |
| 3,311,132 | 3/1967 | McWilliams | 61/112 X |
| 3,466,881 | 9/1969 | Lamy | 61/112 X |
| 4,056,944 | 11/1977 | Lamy | 61/112 X |

*Primary Examiner*—Dennis L. Taylor

[57] ABSTRACT

A heavy duty flexible marine pipeline has the capability of being assembled on the surface of the sea. In order to do this a certain amount of slack is required in the pipeline. Both deep and shallow water systems are described. The deep water system has an operational minimum depth about midway between the sea floor and the surface. Tension force in the pipe sections is automatically compensated and is relayed to adjacent pairs of vertically taut anchor cables. The pipeline is buoyant and the flexible pipe wall has a very high bursting strength and the pipeline is therefore particularly adapted to deep water applications.

14 Claims, 11 Drawing Figures

MARINE PIPELINE

BACKGROUND OF THE INVENTION

This application is a division of my copending application 652,281 filed on Jan. 26, 1976 now abandoned.

The present invention relates to a marine pipeline, particularly, but not exclusively, for the transport of oil or gas.

For heavy duty permanent installations welded rigid steel pipeline has been almost exclusively used. The rigid pipeline is pretty much obliged to accommodate the profile grade of the sea floor which gives rise to many vexing problems, particularly in resisting ocean currents. This is sometimes overcome if the bottom soil allows trenching and burial. Leakage is very difficult to overcome in the very hostile environment of for example 100 fathoms. Welding of damaged parts is then necessary and is both a hazardous and very expensive operation.

Accordingly it is an important object of the invention to reduce material and installation costs of a pipeline in comparison with welded rigid steel pipeline and to improve the rate of installation greatly.

It is another object of the invention to take advantage of water pressure at the operational depth of the pipeline to at least partially neutralize the bursting pressure created by pumps driving liquid along the pipeline.

A further object of the invention is to provide a pipeline which can be completely assembled on the surface of the sea.

By another further object a container for the storage of gas or liquid such as radioactive waste or hazardous by-products of the chemical industry is provided.

It is also an object of the invention to provide prefabricated lengths of assembled pipeline for a pipeline which can then be joined on the sea surface.

SUMMARY OF THE INVENTION

In accordance with the invention there is provided a marine pipeline comprising a plurality of flexible pipe sections coupled together, each section being buoyant in sea water when filled with a fluid (liquid or gas), to be carried by the pipeline. A cable means, preferably formed by four spaced apart cables, extends along the coupled pipe sections and is so coupled thereto by spaced apart snubber means that when the cable means is in tension the pipe sections are slack. A plurality of anchor means, such as an anchor permanently buried in the sea bed or a weight resting on the sea floor, are spaced apart along, and coupled to, the cable means.

For deep water installations, for example 2000 feet below the sea surface, the buoyancy means comprises a plurality of vertically taut anchor cables spaced along the cable means (which may be nylon or saran ropes) and pipe sections. Preferably one buoyancy device is provided for each anchor means to keep the four cables vertically taut. A plurality of weighting means for keeping the pipeline in position along a vertical sinuous path are positioned along the pipeline spaced alternately between the buoyancy devices. Each weighting means may comprise a length of heavy chain attached by cable to the cable means, and, in equilibrium of the pipeline, resting partially on the sea bed. The additional length of pipeline for installation on, or recovery to, the surface is then accommodated in the vertical sinuous path.

For shallow water installations buoyancy devices are also required (except perhaps when the pipe sections are themselves buoyant) and the cable means can be kept usually taut by positioning the anchor means, preferably along a sinuous path.

Deep or shallow water pipelines for gas or oil according to the invention may be used close to the sea floor. Each weighting means may then comprise first and second longitudinal members joined by a plurality of spaced apart transverse flexible members such as chains. The first and second longitudinal members are fastened by comparatively short cables to weights on the sea floor and in use the flexible transverse members are positioned on the pipe sections with the longitudinal members alongside the pipe sections.

The development of a suitable anchoring device, described in U.S. Pat. No. 4,033,281, has made possible the invention, as recited above, of a flexible marine pipeline to be used in water 400 to 2,000 feet in depth for example. With buoyant pipe sections, the pipeline can be completely assembled on the surface of the sea and then hauled down to operational depth with only a small amount of individual diving time and even this time restricted to a maximum depth of 400 feet. Replacement of damaged sections can be made on the surface. Tension force is automatically compensated for and relayed to each anchor by way of the anchor's vertically taut tether cables. Additionally, the pipe wall and the pipe coupling are relieved of virtually all tension by means of the cable means.

Advantage is taken of ambient water pressure at operational depth to neutralize either partially or completely the pressure created by pumps driving liquid along the pipeline. At a certain depth the skin of the pipe will feel no pressure. The pumps have to be shut down to allow retrieval of the pipe to the surface to prevent bursting. For shallow water installations the bursting strength of the pipe wall can be doubled.

Material cost and installation cost are modest even in comparison to a much smaller diameter rigid steel pipe. Rates of installation are incomparably greater.

Once the anchoring devices have been installed flexible pipeline installation is very simple and direct.

Pipe section diameters may for example be between 4 and 20 feet. Since coupling is usually by bolting sections together, welding is not then required. The pipe wall is flexible but has a very high bursting strength.

The foregoing and other objects, features and advantages of the invention will be apparent from the following more particular description of the preferred embodiments of the invention, as illustrated on the accompanying drawings.

It will be understood that the terms "marine" and "sea bed" used in this specification and claims apply to any large body of water whether salt or fresh, and whether called for example a sea, or a lake or by some other name.

The diversity of functions of the specification may best be comprehended if a list of elements and their purported use is supplied.

| | Element | Its Use |
|---|---|---|
| 1. | Pipe Coupling | Allows pipe lengths to be bolted together. |
| 2. | Snubber | A device for the collection of tension force acting to tear the pipeline apart to then relay this force to a plurality of tension cables. |
| 3. | Octahedron | Provides strong buoyant force to keep anchor tether cables taut. |
| 4. | Anchor | Deeply buried permanent anchor encapsulated by a layer of concrete. |
| 5. | Dragging chain | A weight. The stronger the tension force acting on the pipeline the more weight of chain is lifted to neutralize this force. |
| 6. | Radio monitor | Pipeline internal pressure radioed to shore station. Any sharp drop in pressure warns of trouble. |
| 7. | Tension cables (nylon ropes) | Relays tension force from a plurality of snubbers to pairs of adjacent tether cables to anchors. |
| 8. | Concrete blocks | A dragging weight to be used for water less than 200 feet in depth. |
| 9. | Clamp | Common device for mating a pair of cables. |
| 10. | Coupling cable | A short length spliced across coupling after mating of a pair of pipes with sag induced in pairs of temporary ropes to provide seizure to coupling. |
| 11. | Sag | Sag must be provided in pipe in order to allow snubber to collect tension force. |
| 12. | Temporary seizure ropes | Prior to installation of the pipeline these ropes are seized to coupling and to loose end of tension rope. |
| 13. | Sleeve | Supplies rigidity to interior pipe wall. |
| 14. | Pipe wall | A flaccid steel wire reinforced plastic composite. |
| 15. | Compression plate | Squeezes pipe wall to sleeve. |
| 16. | Bolts | Applies pressure to compression plate. |
| 17. | Aluminum pipe | Thick walled tubular center section of snubber unit. |
| 20. | Sea surface | |
| 21. | Sea bed | |
| 22. | Barge with lifting tackle | For use in joining pipe line sections. |
| 23. | Block and tackle | For pulling pipe coupling into position during installation. |
| 24. | Snubber walls | To form framework of snubber. |
| 25. | Plates | Used in clamping snubber walls together. |
| 26. | Plates | To clamp tension cables to snubber. |
| 27. | Bolts | To clamp snubber walls together. |
| 28. | Spacer | Used in clamping snubber walls together. |
| 29. | Nuts | Nuts to clamp snubber walls together. |
| 31. | Grooves | For tension cables passing through snubber. |
| 32. | Clamps | To prevent tension cables passing through snubber. |

DESCRIPTION OF PREFERRED EMBODIMENTS

Figure 1:
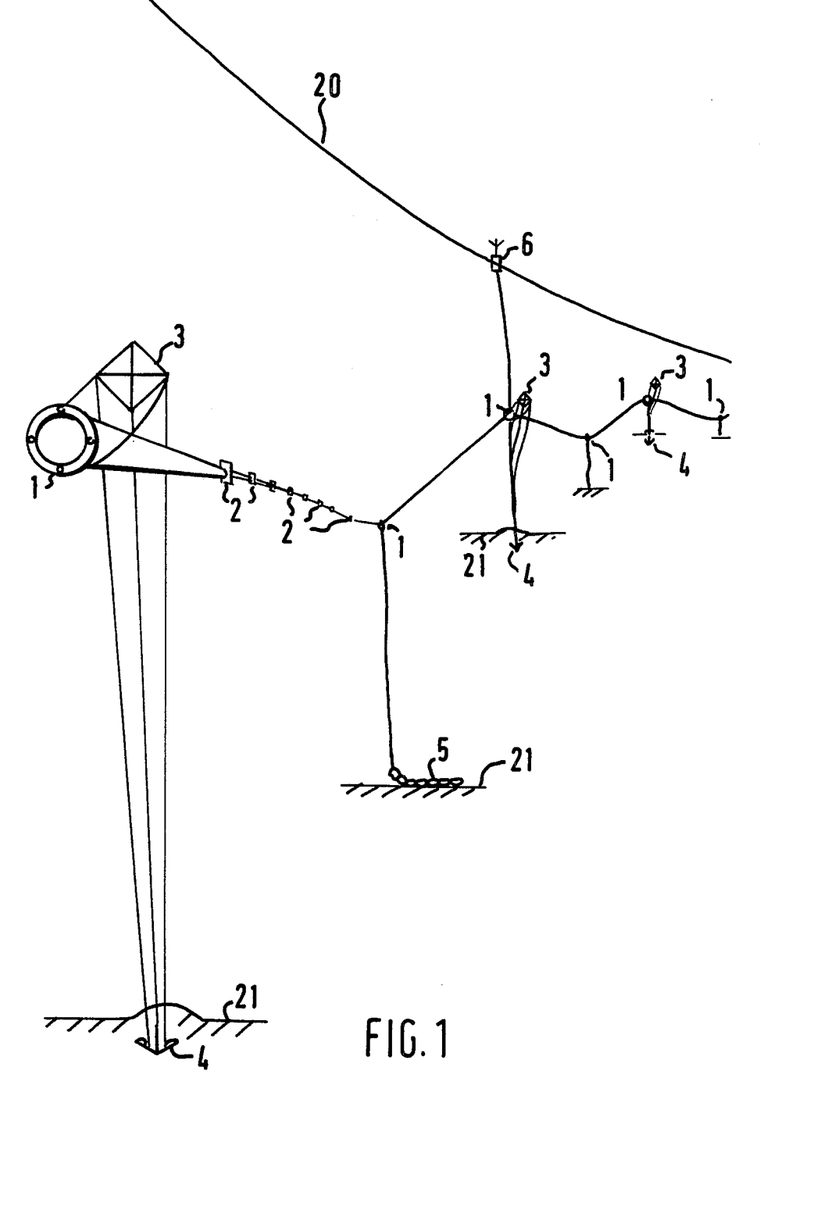
FIG. 1 is a schematic drawing of a marine pipeline according to the invention in deep water.

In FIG. 1 pipeline couplings 1 allow sections of buoyant flexible pipeline to be coupled together and along the pipeline a plurality of pipe snubbers 2 is required to relay tension from the pipeline to cables (not shown in FIG. 1) extending along the pipeline. A six foot diameter pipe requires one snubber for every 20 feet of pipeline. Spacing for larger sizes is more distant.

Individual pipe sections for a six foot diameter pipe is 200 feet but a pipe reach (group of coupled sections) can easily become 1,000 feet in length.

Strongly buoyant octahedrons 3 as disclosed in U.S. Pat. No. 4,033,281 are seized at for example a depth of 400 feet by two pairs of vertically taut tether cables to anchors 4 in the sea bed 21 at a depth of for example 800 feet. Pipe couplings 1 or pipe snubbers 2 are seized, to the taut tether cables. A sag is created between pairs of adjacent anchors by using a dragging chain 5 partially raised from the sea floor and using its weight to maintain the sag. Any attempt by tension force to reduce the sag to a horizontal profile results in lifting the chain. This gradually increases the weight and equilibrium is eventually restored.

A transmitter buoy 6 floating on the sea surface 20 is spaced at ten miles intervals to monitor flow rates to a shore based station.

Figure 2:
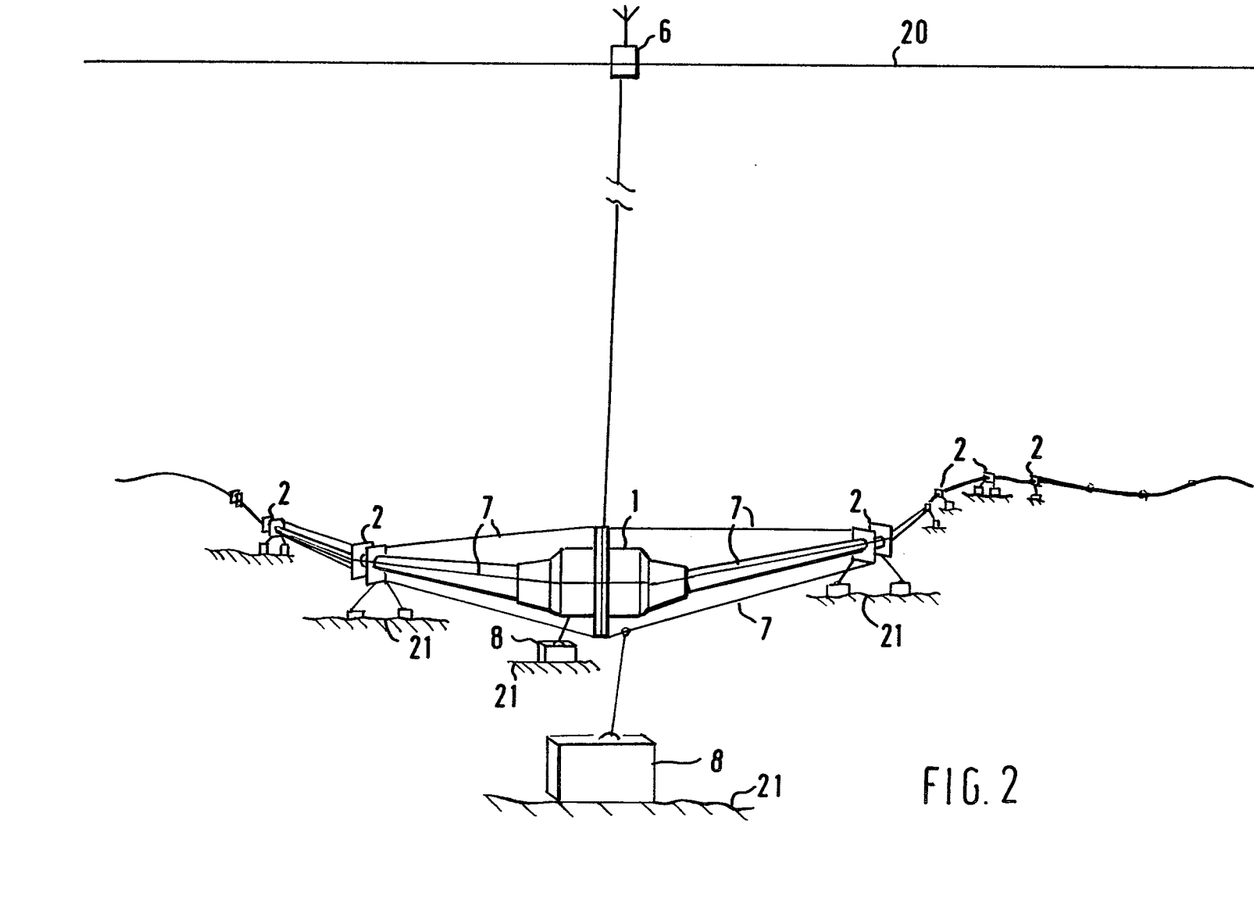
FIG. 2 is a schematic drawing of a marine pipeline according to the invention in shallow water.

FIG. 2 shows a modified shallow water version (for example for a depth of 100 feet) of the pipeline of FIG. 1, with the induced sag necessary for retrieval of the pipe to the surface, assuming a zig zag or more precisely a sinuous pattern near to the sea floor. Cables 7 for taking tension which would otherwise be applied to the pipe sections are shown. The buoyant pipeline is primarily weighted by concrete blocks 8 but a wide variety of other weighting devices may be used to maintain a uniform profile. one example is to attach a pair of buckets to the uppermost tension cable 7 and to add dry sand to the buckets on either side of the pipe to give the necessary ballast. The pipeline should clear the sea floor to prevent damage to the pipe wall by abrasion with the bottom. RWL.

Figure 3:
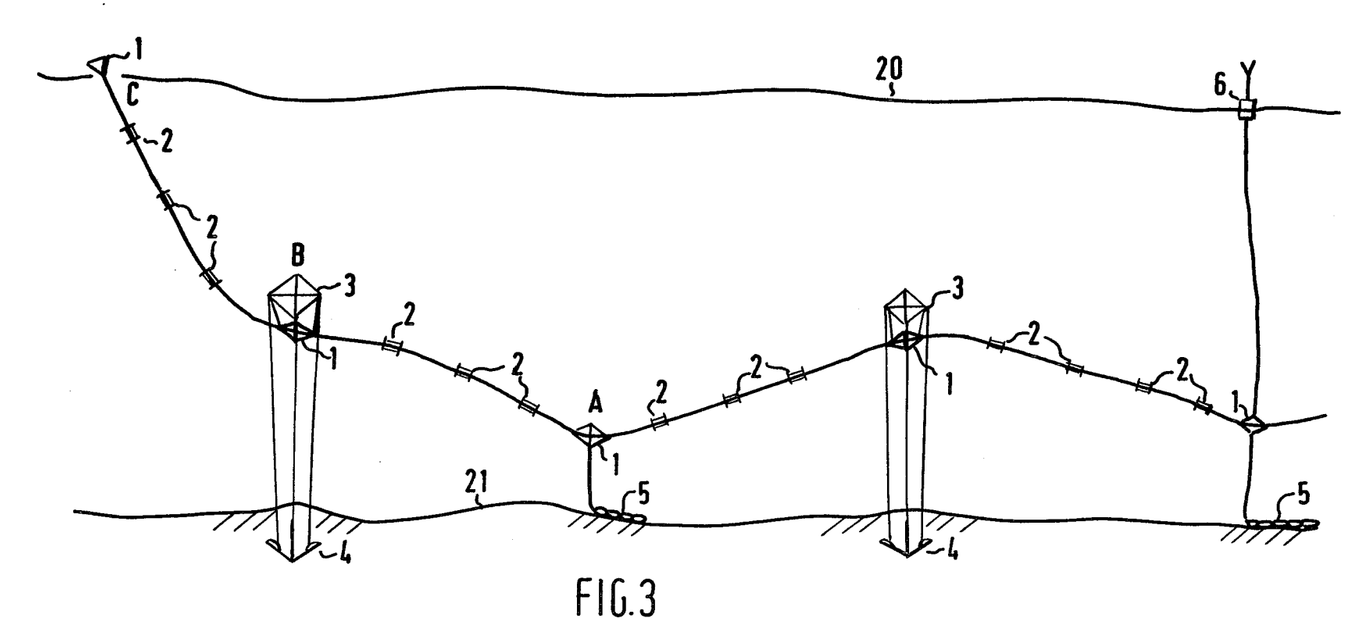
FIG. 3 shows the deep water pipeline during installation.

A completed installation of a section of deep water pipeline is shown in FIG. 3 with a further section having an end C floating on the surface 20 to allow more sections to be coupled. Section A to B is filled with sea water. Section B to C is partially filled with air.

Figure 4:
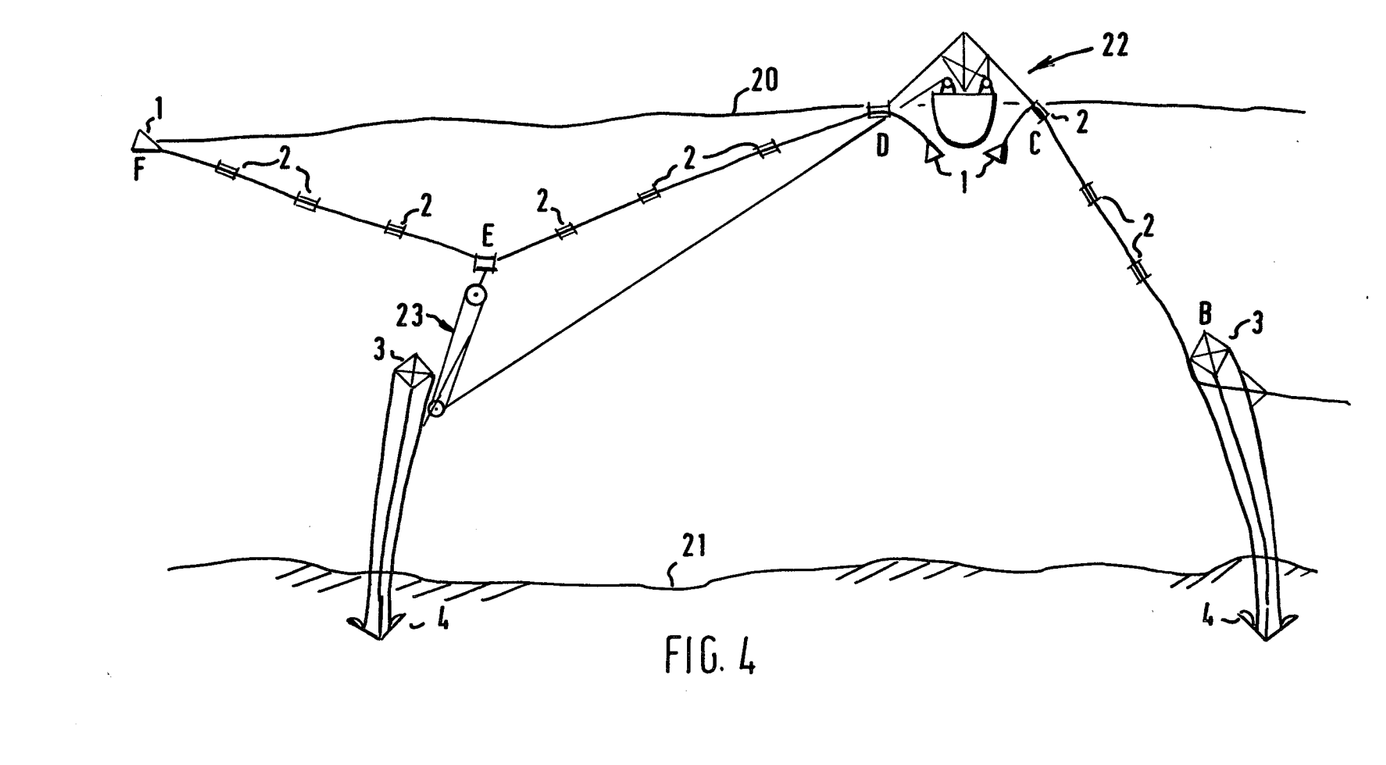
FIG. 4 shows a new section of deep water pipeline about to be coupled to existing sections.

FIG. 4 depicts a fresh reach of pipeline section D to F in the process of being mated to the existing pipeline. A barge with lifting tackle indicated generally at 22 is employed. Each fresh reach is filled with air under slight pressure at the fabrication plant and a plurality of reaches are then rafted to the installation site. As section D to E is seized and allowed to fill with sea water a block and tackle 23 pulls a pipe coupling at E into position alongside the tether cables of an octahedron 3. Section B to C is allowed to fill with sea water and then the couplings at C and D are bolted together. A length of heavy chain 5 (see FIG. 5) is then attached by means of a cable just long enough to hold a desired portion of the chain 5 vertical in equilibrium of the pipeline, and the pipeline is allowed to sink to its normal operating attitude. An inspection by mini sub of each coupling made at sea is required to make sure that pipeline specification is met.

Figure 5:
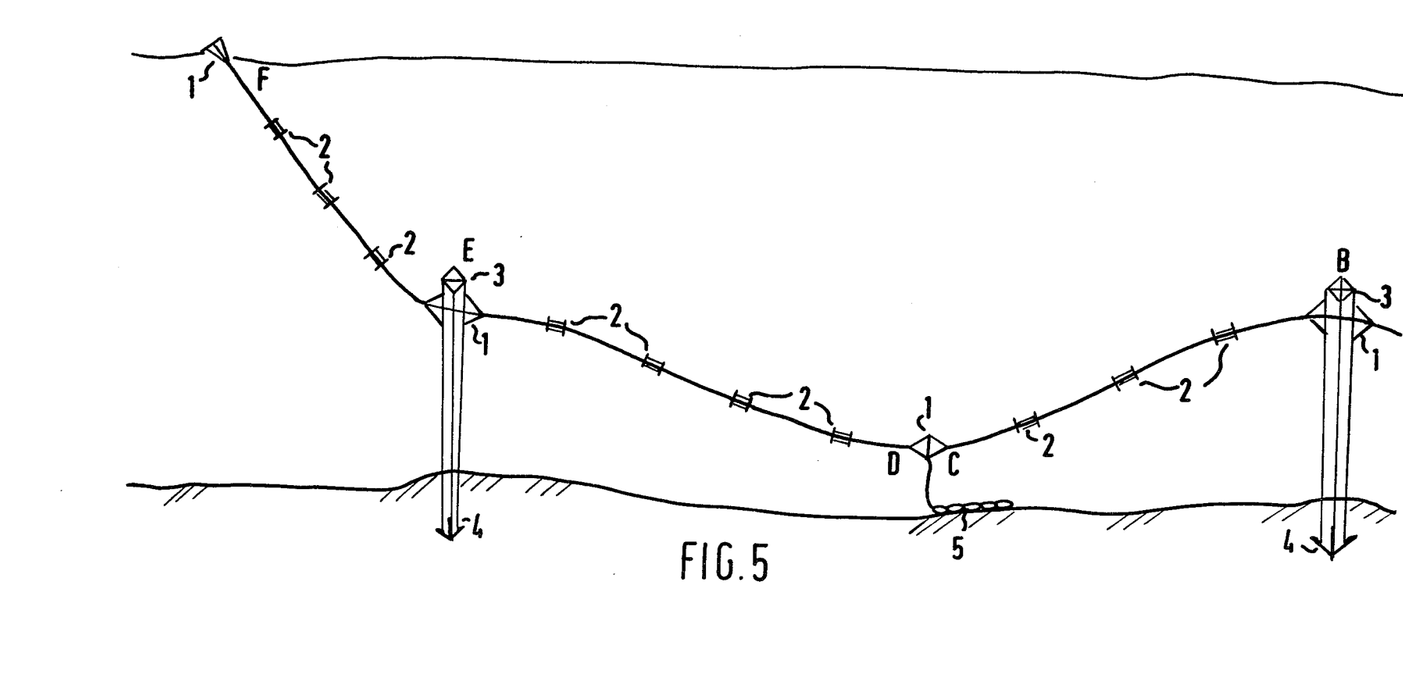
FIG. 5 shows the new pipeline section of FIG. 4 with one end in position below the sea surface.

FIG. 5 shows the coupling of ends C and D in position after having been added to a reach of completed pipeline. The method is modified slightly for the shallow water version but it is basically the same and will be apparent to those skilled in the art.

DESCRIPTION OF PREFERRED EMBODIMENTS

In FIG. 1 pipeline couplings 1 allow sections of buoyant flexible pipeline to be coupled together and along the pipeline a plurality of pipe snubbers 2 is required to relay tension from the pipeline to cables (not shown in FIG. 1) extending along the pipeline. A 6 foot diameter pipe requires one snubber for every 20 feet of pipeline. Spacing for larger sizes is more distant.

Individual pipe sections for a 6 foot diameter pipe is 200 feet but a pipe reach (group of sections) can easily become 1,000 feet in length.

A strongly buoyant octahedron 3 as disclosed in U.S. Pat. No. 4,033,281 is seized at for example a depth of 400 feet by two pairs of vertically taut tether cables to an anchor 4 in the sea bed 21 at a depth of for example 800 feet. Pipe snubbers 2 are seized, one each, to the taut tether cables. A sag is created between pairs of adjacent anchors by using a dragging chain 5 partially raised from the sea floor and using its weight to maintain the sag. Any attempt by tension force to reduce the sag to a horizontal profile results in lifting the chain. This gradually increases the weight and equilibrium is eventually restored.

A transmitter buoy 6 floating on the sea surface 20 is spaced at ten mile intervals to monitor flow rates to a shore based station.

FIG. 2 shows a modified shallow water version (for example for a depth of 100 feet) of the pipeline of FIG. 1, with the induced sag necessary for retrieval of the pipe to the surface, assuming a zig zag or more precisely a sinuous pattern near to the sea floor. Cables 7 for taking tension which would otherwise be applied to the pipe sections are shown. The buoyant pipeline is primarily weighted by concrete blocks 8 but a wide variety of other weighting devices may be used to maintain a uniform profile. One example is to attach a pair of buckets to the uppermost tension cable 7 and to add dry sand to the buckets on either side of the pipe to give the necessary ballast. The pipeline should clear the sea floor to prevent damage to the pipe wall by abrasion with the bottom.

A completed installation of a section of deep water pipeline is shown in FIG. 3 with a further section having an end C floating on the surface 20 to allow more sections to be coupled. Section A to B is filled with sea water. Section B to C is partially filled with air.

FIG. 4 depicts a fresh reach of pipeline section D to F in the process of being mated to the existing pipeline. A barge with lifting tackle indicated generally at 22 is employed. Each fresh reach is filled with air under slight pressure at the fabrication plant and a plurality of reaches are then rafted to the installation site. As section D to E is seized and allowed to fill with sea water a block and tackle 23 pulls a pipe snubber at E into position alongside the tether cables of an octahedron 3. Section B to C is allowed to fill with sea water and then the couplings at C and D are bolted together. A length of heavy chain 5 (see FIG. 5) is then attached by means of a cable just long enough to hold a desired portion of the chain 5 vertical in equilibrium of the pipeline, and the pipeline is allowed to sink to its normal operating attitude. An inspection by mini sub of each coupling made at sea is required to make sure that pipeline specification is met.

FIG. 5 shows the coupling of ends C and D in position after having been added to a reach of completed pipeline. The method is modified slightly for the shallow water version but it is basically the same and will be apparent to those skilled in the art.

Figure 6:
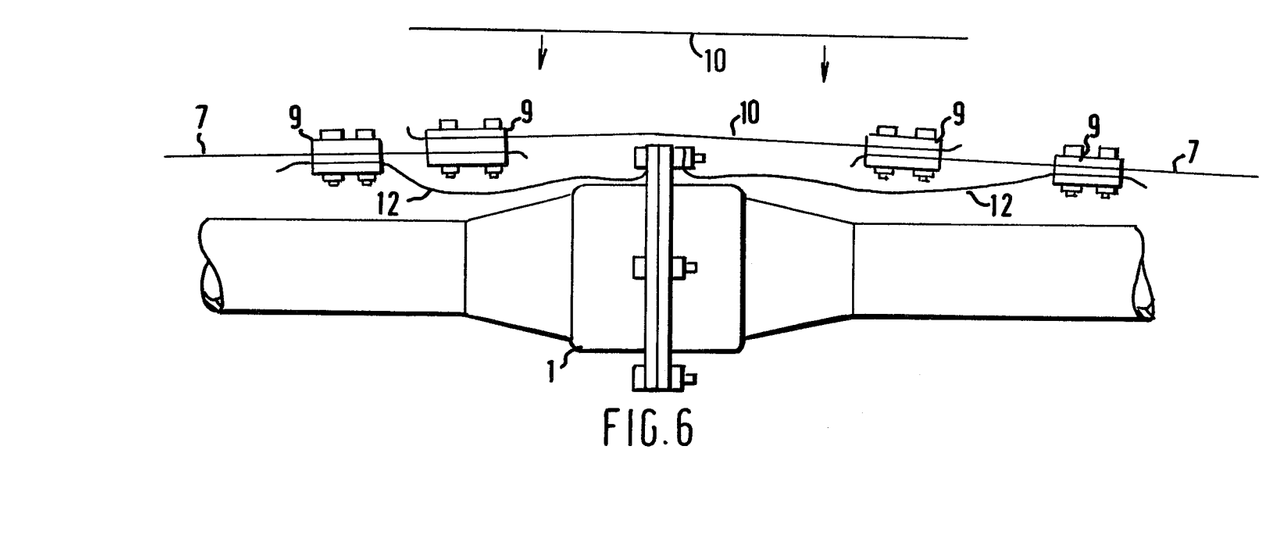
FIG. 6 is a schematic drawing of a coupling between pipeline sections showing how tension in cables is carried across the coupling.

In order to relieve tension in the pipeline at couplings between pipe sections it is necessary to induce slack in cables 12 (see FIG. 6) which are terminated at the pipe couplings during fabrication at a shore based plant. After two pipes are bolted together a short length of cable 10 is spliced to the tension cable 7 by means of clamps 9. A "comealong" (not shown) induces slack and the free end of cable length 10 is clamped to the adjacent tension cable. The slack shows up in the cables 12 shown in FIG. 6 and the cable length 10 is shown both before and after installation.

Figure 7:
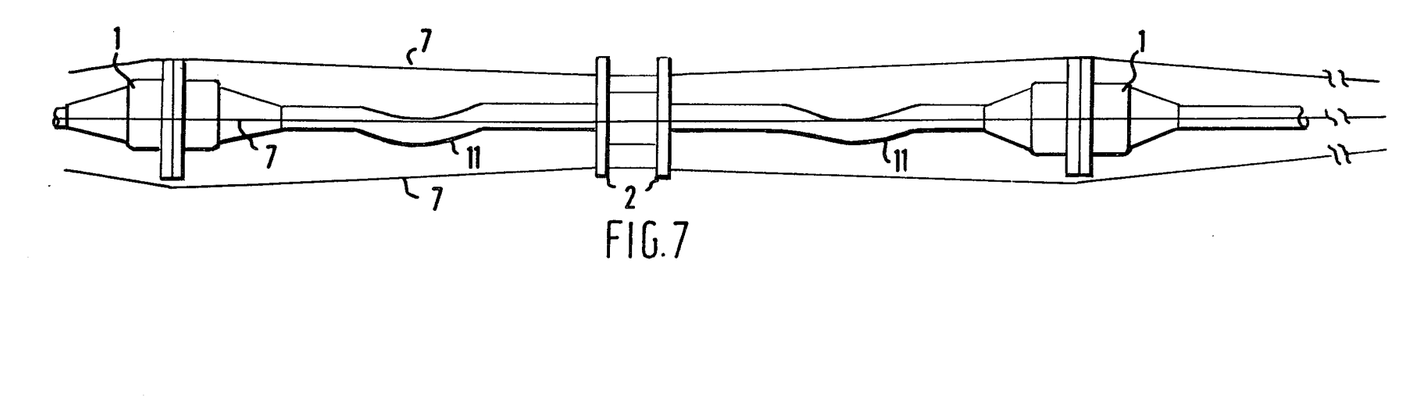
FIG. 7 is a schematic drawing including a snubber showing how pipe sections are coupled to the cables.

FIG. 7 illustrates how induced slack in the pipe sections allows the transfer of tension force from the pipe wall to the pipe snubbers. This operation takes place in the fabricating plant when the snubbers and the tension cables are first progressively added to the pipe as it is fabricated. The slack shows up at 11 and is quite generous initially. The pipe couplings may then be sealed and the pipe gradually filled with air. As the pipe fills the clamps to the snubbers are gradually tightened to give the desired degree of slack. In this way a long reach of pipeline is prefabricated ready for transport to an installation site.

A view of the end wall of a pipe snubber 2 suitable for the above described pipelines will now be described. The snubber wall 24 (see FIG. 8) must not only be very strong, it should also be strongly buoyant and be inert to corrosion by sea water. Further, it should have a smooth very tough surface. All of these requirements can be met, for example by using a composite of foamed urethane reinforced with open mesh glass fabric along with fiberglass. A coating of polyvinyl fluoride is applied to this material to give a smooth surface to the snubber. The flange unit of the pipe couplings 1 is a similar composite product.

Figure 8:
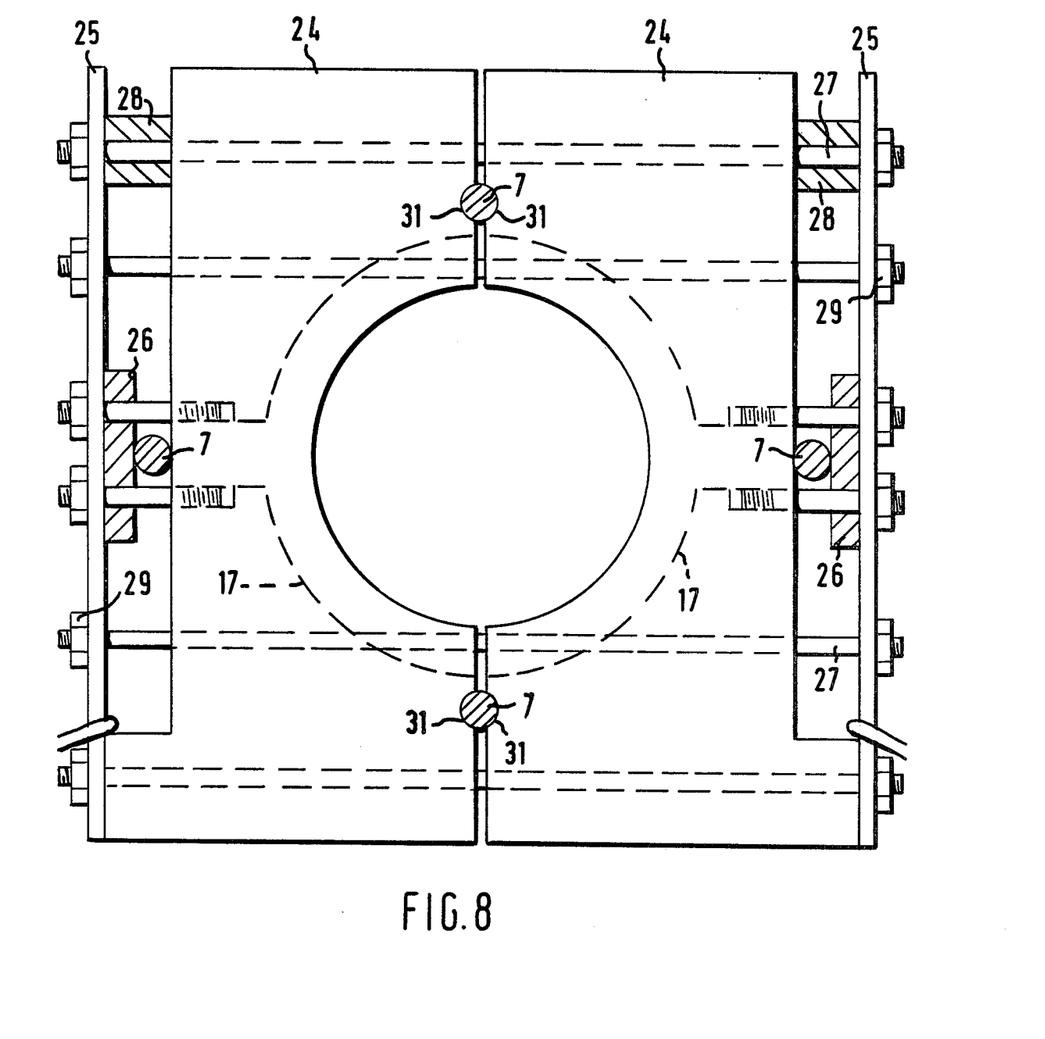
FIG. 8 is an end view of a snubber.

The tension cables 7 are clamped to, and between, the edges of snubber walls 24 by means of plates 25 and 26, bolts 27, collars 28 and nuts 29. As seen in FIG. 8 two of the cables 7 are clamped snugly in grooves 31 while the other two such cables are clamped between the plates 26 and the walls 24. In FIG. 8 the pipe section is omitted for simplicity.

Figure 9:
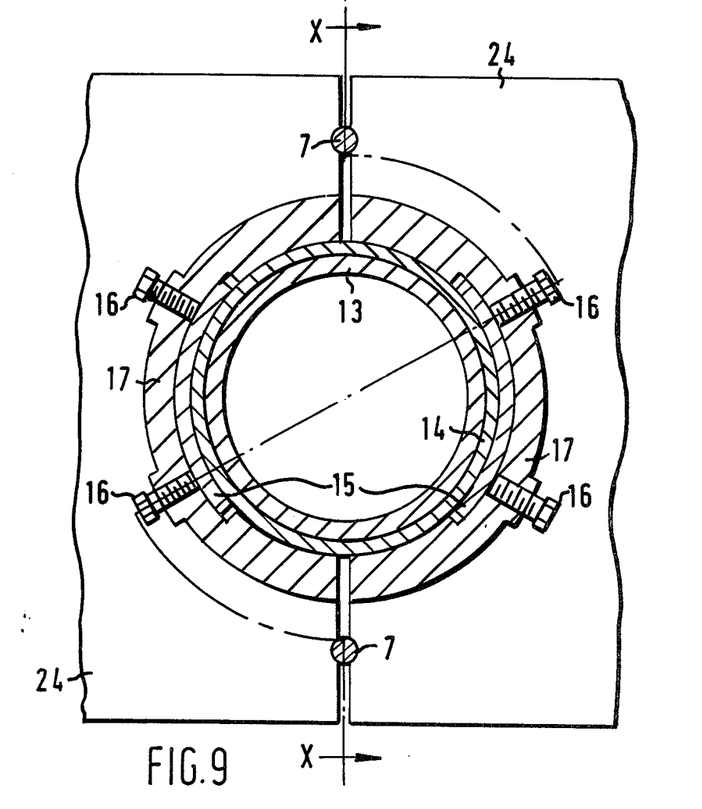
FIG. 9 shows details of how the snubber is seized to the wall of a pipe section.
Figure 10:
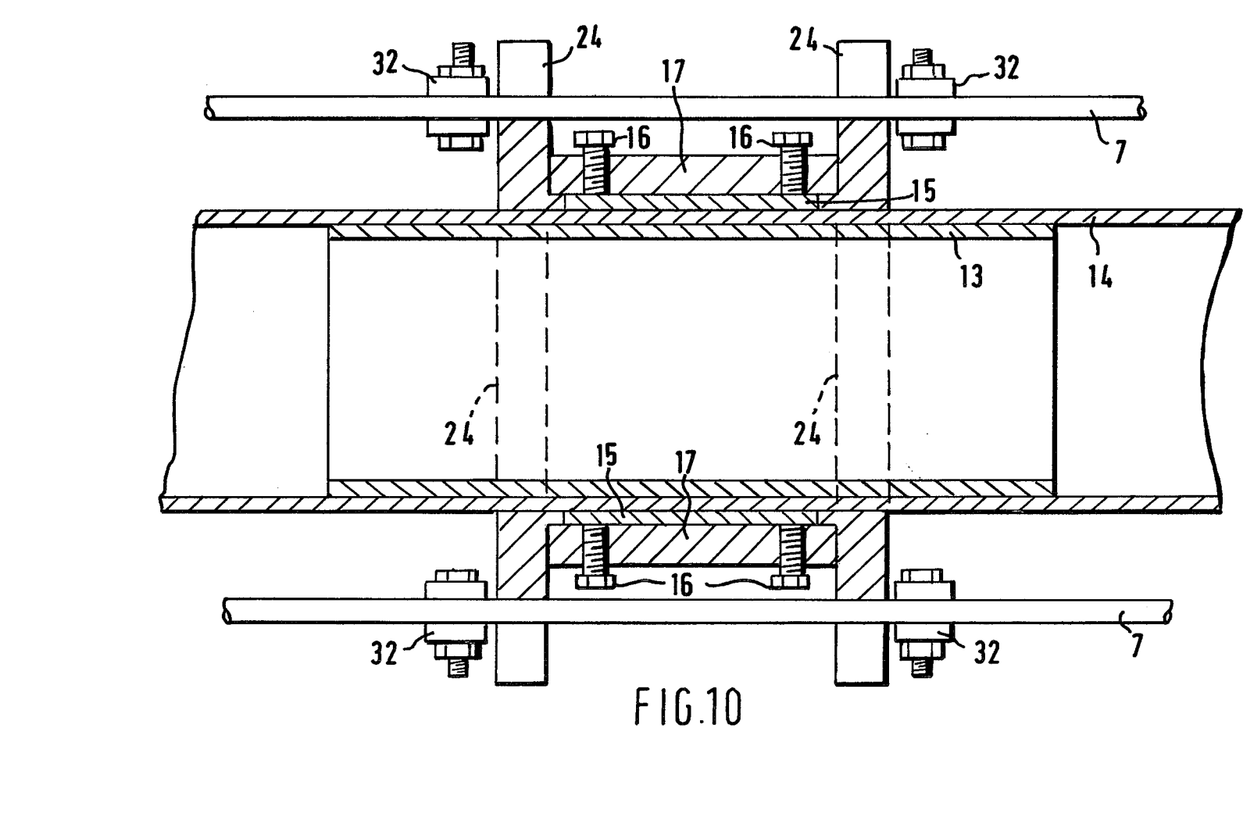
FIG. 10 shows a cross-sectional side view on the line X — X of the snubber of FIG. 9.

As seen in FIGS. 8, 9 and 10 each snubber has two pairs of end walls 24 separated by an aluminium casting 17 slit into semi-cylindrical sections. Each section is machined to receive a compression plate 15 (see FIG. 9) used to squeeze the pipe wall 14 towards an interior metal sleeve 13 inserted as the pipe section is fabricated. Bolts 16 are used to squeeze the pipe wall between the sleeve 13 and the plate 15 so fixing the snubber to the pipe section.

Figure 11:
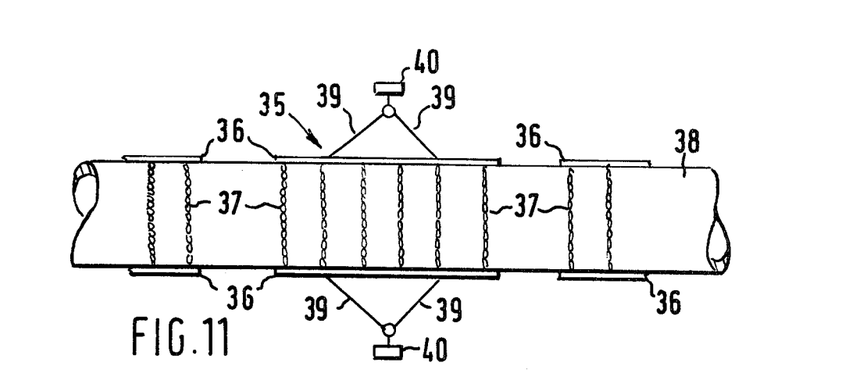
FIG. 11 is a schematic plan view of weighting means for a marine pipeline which is installed close to the sea floor.

FIG. 10 also indicates an alternative way of clamping the end walls 24 to the cables 7. Clamps 32 are used to prevent the upper and lower wires as seen in FIGS. 8, 9 and 10 from sliding through the grooves 31.

Where a pipeline according to the invention is to be installed close to the sea floor weighting means for buoyancy control of the type shown in FIG. 11 may be used, other details of the pipeline system being omitted for simplicity. Each weighting means indicated generally at 35 comprises longitudinal members 36 such as steel pipes joined by transverse chains 37 laid across the pipe designated 38. The longitudinal members 36 are attached by short cables 39 to weights 40 resting on the sea bed. A plurality of such weighting means sufficient to keep the pipeline in place are spaced apart along the pipeline.

While the invention has been particularly shown and described with reference to the preferred embodiments thereof, it will be understood by those skilled in the art that various changes in form and detail may be made therein without departing from the spirit and scope of the invention.

What is claimed is:

1. A marine pipeline comprising
a plurality of flexible pipe sections coupled together,
cable means extending along the coupled pipe sections,
a plurality of snubber means spaced apart along the pipe sections and so fixed to the cable means and the pipe sections that when the cable means is in tension the pipe sections are slack,
buoyancy means tending to cause the pipe sections to float, and
a plurality of anchor means spaced apart along the pipe sections and the cable means to anchor the sections at a depth between the sea bed and its surface, the length of coupled pipeline sections being greater than that required for a direct course to enable portions of the pipeline to be on the surface without the pipeline being interrupted.

2. A marine pipeline according to claim 1 wherein the pipe sections, being buoyant when filled with a fluid to be carried by the pipe line, at least partially constitute the buoyancy means.

3. A marine pipeline for shallow water according to claim 2 wherein each anchor means comprises a weight resting on the sea bed, the weights being positioned along a zig-zag course.

4. A marine pipeline according to claim 2 wherein the buoyancy means includes a plurality of spaced apart buoyancy devices and the pipeline comprises a plurality of tension weights at least partially resting on the sea bed spaced apart along the cable means and alternating with the buoyancy devices, each weight being coupled to the cable means to cause the pipe sections to be pulled down in tension to sag between each adjacent pair of buoyancy devices.

5. A marine pipeline according to claim 4 wherein each anchor means comprises an anchor permanently buried in the sea bed.

6. A marine pipeline according to claim 5 wherein each anchor means has a corresponding buoyancy device forming part of the buoyancy means and is coupled to the cable means and pipe sections by way of its corresponding buoyancy device.

7. A marine pipeline according to claim 6 wherein each weight is a length of chain which, when the pipeline is in equilibrium, rests partially on the sea bed.

8. A marine pipeline according to claim 7 wherein the cable means comprises four cables spaced around the pipe sections.

9. A marine pipeline according to claim 3 wherein the cable means comprises four cables spaced around the pipe sections.

10. A marine pipeline according to claim 8 wherein each snubber means comprises two semi-cylindrical sections and means for clamping the two semi-cylindrical sections around a pipe section with the four cables clamped to the semi-cylindrical sections.

11. A marine pipeline according to claim 9 wherein each snubber means comprises two semi-cylindrical sections, and means for clamping the two semi-cylindrical sections around a pipe section with the four cables clamped to the semi-cylindrical sections.

12. A pipe assembly for a marine pipeline comprising a plurality of flexible buoyant pipe sections coupled together by means of couplings between the pipe sections, each pipe section being made from a flexible material so that the pipeline may yield when subjected to external forces,
a plurality of cables extending along the coupled pipe sections, and
a plurality of snubber means spaced apart along the coupled pipe sections and so fixed to the cables that when the cables are taut the pipe sections are slack and there is comparatively little tension across the said couplings.

13. A pipe assembly according to claim 12 wherein there are four cables spaced around the pipe sections, and each snubber means comprises two semi-cylindrical sections, and means for clamping the two semi-cylindrical sections around the pipe section with the four cables clamped to the semi-cylindrical sections.

14. A marine pipeline close to the sea bed according to claim 1 including a plurality of weighting means for buoyancy control each comprising first and second weights resting on the sea floor attached by cable means to first and second longitudinal members, respectively, alongside one or more of the pipe sections, and a plurality of spaced apart transverse flexible members joining the longitudinal members and draped over one or more of the pipe sections.

* * * * *